(12) United States Patent
Maruoka

(10) Patent No.: US 7,909,077 B2
(45) Date of Patent: Mar. 22, 2011

(54) HEAVY DUTY TIRE

(75) Inventor: Kiyoto Maruoka, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 638 days.

(21) Appl. No.: 11/806,018

(22) Filed: May 29, 2007

(65) Prior Publication Data

US 2008/0035261 A1     Feb. 14, 2008

(30) Foreign Application Priority Data

Aug. 8, 2006   (JP) .................. 2006-216015

(51) Int. Cl.
*B60C 15/00* (2006.01)
*B60C 15/06* (2006.01)

(52) U.S. Cl. ........ 152/539; 152/541; 152/542; 152/546; 152/547; 152/555

(58) Field of Classification Search .................. 152/539, 152/540, 541, 542, 543, 544, 545, 546, 547, 152/548, 549, 550, 551, 552, 553, 554, 555

See application file for complete search history.

(56) References Cited

U.S. PATENT DOCUMENTS 4,721,144 A * 1/1988 Hara et al. .................... 152/541

FOREIGN PATENT DOCUMENTS

| JP | 2-133208 | * | 5/1990 |
| JP | 2002-205508 A | | 7/2002 |

* cited by examiner

*Primary Examiner* — Justin Fischer
(74) *Attorney, Agent, or Firm* — Birch, Stewart, Kolasch & Birch, LLP

(57) ABSTRACT

A heavy duty tire comprises a bead filler disposed in each bead portion (4). The bead filler (8) comprises: a main layer (13) having a complex elastic modulus $E^*2$ of from 2.0 to 6.0 Mpa; and a fastening layer (12) having a complex elastic modulus $E^*1$ of from 20 to 70 Mpa. The fastening layer comprises a base portion (12B) and an axially inner portion (12A) to have a L-shaped cross section. The height Ha of the axially inner portion (12A) is 35 to 100 mm and not more than the height Hb of the main layer (13), and the radial height Hb is 40 to 100 mm, each from the bead base line. The thickness of the axially inner portion (12A) gradually decreases towards the radially outside so that, when measured along a straight line X1 drawn perpendicularly to the axially outer surface of the bead filler from a point P1 thereon at a distance of 25 mm radially outward from the bead base line: the thickness Tb from the axially outer surface of the bead filler to the interface between the axially inner portion (12A) and the main layer is 7.0 to 13.0 mm; the thickness Ta from the interface to the axially inner surface of the axially inner portion (12A) is 1.0 to 4.0 mm; and the ratio Ta/Tb is 0.1 to 0.35.

5 Claims, 4 Drawing Sheets

HEAVY DUTY TIRE

BACKGROUND OF THE INVENTION

The present invention relates to a pneumatic tire more particularly to a bead structure for heavy duty tires capable of improving the bead durability.

When a pneumatic tire is loaded, as the bead portion and sidewall lower portion are forced toward the axially outside of the tire, shear stress occurs between the reinforcing cords and the axially outwardly adjacent rubber.

In particular, in the case of tires for heavy duty vehicles such as trucks, buses and the like, as the tires are used under severe service conditions, the shear stress becomes large to increase the likelihood that a separation failure is caused between the reinforcing cords and rubber.

Conventionally, the heavy duty tires are provided with a stiff bead structure to reduce the deformation due to heavy loads for example as shown in Japanese Patent Application Publication No. 2002-205508. More specifically, the bead portion is as shown in FIG. 4, provided between a carcass main portion (a1) and a turned up portion (a2) with a bead apex (b) composed of a bulky stiffener (b1) made of a high modulus rubber and a softener (b2) made of a softer low modulus rubber. In this structure, if it is desired to further decrease the deformation, it is necessary to increase the volume of high modulus rubber forming the stiffener (b1). If the volume is increased, however, the weight is increased and the heat generation during running is also increased. As a result, the bead durability is rather deteriorated, and the fuel consumption of the vehicle is increased, going against to the trend.

SUMMARY OF THE INVENTION

It is therefore, an object of the present invention to provide a heavy duty tire, in which the bead durability is improved without increasing the weight or volume of the bead apex, especially that of the high modulus rubber, and thereby the amount of carbon black which is usually used in such a high modulus rubber can be reduced, in other words, the amount of a petrochemical can be reduced.

According to the present invention, a heavy duty tire comprises: a tread portion; a pair of sidewall portions; a pair of bead portions each with a bead core therein; a carcass ply having a main portion extending from the axially inside of the bead core in one of the bead portions to the axially inside of the bead core in the other bead portion: and a bead filler disposed on the axially outside of the carcass ply main portion in each of the bead portions, the bead filler having: an axially inner surface abutting on the main portion of the carcass ply; an axially outer surface; and a radially inner surface, to have a radially outwardly tapered cross sectional shape, wherein the bead filler comprises: a main layer made of a rubber having a complex elastic modulus E*2 of from 2.0 to 6.0 Mpa; and a fastening layer made of a rubber having a complex elastic modulus E*1 of from 20 to 70 Mpa, the fastening layer comprises a base portion (12B) and an axially inner portion (12A) to have a L-shaped cross section, the base portion (12B) extends along the radially inner surface of the bead filler, the axially inner portion (12A) extends radially outwardly from the axially inner end of the base portion along the axially inner surface of the bead filler, the radial height Ha of the axially inner portion (12A) is in a range of from 35 to 100 mm from the bead base line, and not more than the height Hb of the main layer, and the radial height Hb is in a range of from 40 to 100 mm from the bead base line, and the thickness of the axially inner portion (12A) gradually decreases towards the radially outside of the tire so that, in a cross section of the tire including the rotational axis of the tire, when measured along a straight line X1 drawn perpendicularly to the axially outer surface of the bead filler from a point P1 on the axially outer surface at a distance of 25 mm radially outward from the bead base line: the thickness Tb from the axially outer surface of the bead filler to the interface between the axially inner portion (12A) and the main layer is 7.0 to 13.0 mm; the thickness Ta from the interface to the axially inner surface of the axially inner portion (12A) is 1.0 to 4.0 mm; and the ratio Ta/Tb is 0.1 to 0.35.

In this application, the sizes, dimensions, positions and the like of the tire are referred to as those in the standard state of the tire unless otherwise noted.

Here, the standard state is that the tire is mounted on a standard wheel rim and inflated to 50 kPa, but loaded with no tire load. The standard wheel rim is a wheel rim officially approved for the tire by standard organization, i.e. JATMA (Japan and Asia), T&RA (North America), ETRTO (Europe), STRO (Scandinavia) and the like. For example, the standard wheel rim is the "standard rim" specified in JATMA, the "Measuring Rim" in ETRTO, and the "Design Rim" in TRA.

The height means a distance measured from the bead base line BL unless otherwise noted.

The bead base line BL is a straight line drawn in parallel with the tire rotational axis, passing through the bead heel points. More specifically, the bead base line passes through a radial position corresponding to the rim diameter of the standard wheel rim.

The complex elastic modulus E* is measured at a temperature of 70 degrees C., frequency of 10 HZ, initial strain of 10%, and amplitude of Dynamic strain of +/−2%.

DESCRIPTION OF THE PREFERRED EMBODIMENTS

Figure 1:
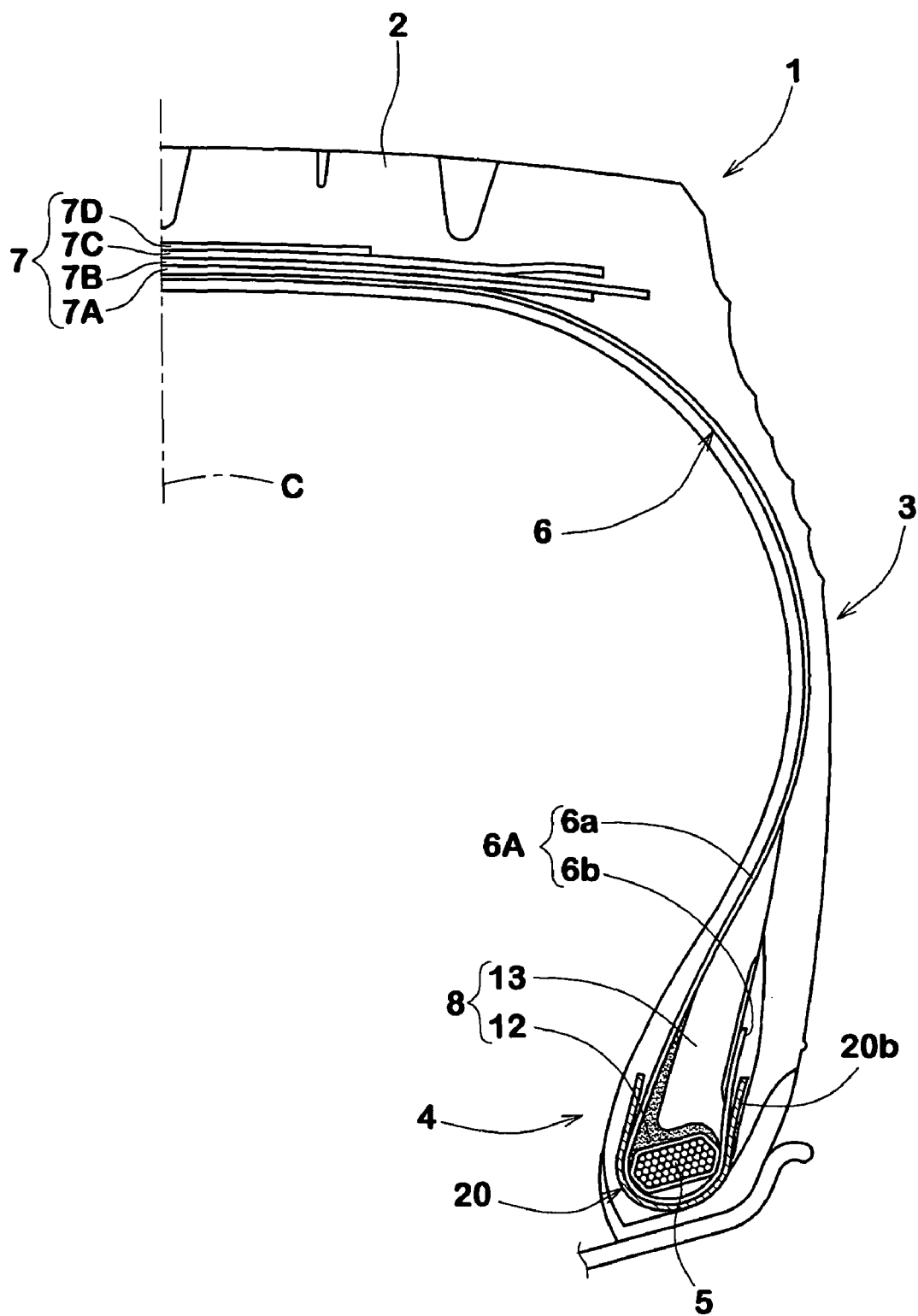
FIG. 1 is a cross sectional view of a heavy duty tire according to the present invention.

Embodiments of the present invention will now be described in detail in conjunction with the accompanying drawings.

In the drawings, heavy duty radial tire 1 according to the present invention comprises: a tread portion 2; a pair of sidewall portions 3; a pair of axially spaced bead portions 4 each with a bead core 5 therein; a carcass 6 extending between the bead portions 4; and a belt 7 disposed radially outside the carcass 6 in the tread portion 2.

FIG. 1 shows a right half of the tire 1 in the standard state. The left half is symmetrical to the right half about the tire equatorial plane C. In FIG. 1, the tire 1 has the bead structure shown in FIG. 2. But it is also possible that the tire 1 has the bead structure shown in FIG. 3. In any case, the embodiments are a heavy duty radial tire for trucks and buses, mounted on a 15-degree-taper center-drop rim J having a pair of bead seats Js for the bead portions 4 tapered at 15 degrees toward the axial center of the wheel rim.

The belt comprises a breaker 7 and optionally a band. The breaker 7 comprises at least two cross plies of high modulus cords, and usually, one or two additional plies are disposed. For the breaker cords, steel cords and/or high modulus organic fiber cords can be used.

The belt in this example is composed of four breaker plies 7A, 7B, 7C and 7D: a radially innermost ply 7A made of rubberized parallel steel cords laid at an angle of from 45 to 75 degrees with respect to the tire equator C; and radially outer plies 7B, 7C and 7D each made of rubberized parallel steel cords laid at an angle of from 10 to 35 degrees with respect to the tire equator C.

The bead core 5 is formed by orderly winding at least one steel wire 5s into a specific cross sectional shape, whereby the bead core 5 has the multi layered windings 10 of the steel wire(s) 5s. The bead core 5 in this example further includes a rubber based warping layer 11 on the outside of the windings 10. The layer 11 can be (1) a layer of a hard rubber only, (2) a rubber layer in which cords are embedded, (3) a layer of a rubberized fabric such as canvas or the like. The layer 11 is wound around the windings 10 to prevent loosening of the windings and thereby to keep the predetermined cross sectional shape.

The cross sectional shape of the bead core 5 has a radially inner side SL which is relatively long and substantially parallel with the bottom surface of the bead portion 4 so as to become substantially parallel with the bead seat is of the rim J when the tire is mounted on the rim J.

In this example, the cross sectional shape is a hexagonal shape which is generally long in the tire axial direction. The radially inner side SL and a radially outer side SU are parallel with each other and are inclined at substantially 15 degrees with respect to the tire axial direction, because the bead seat is tapered at 15 degrees toward the axially inside. The axially inner two sides are in a V formation, defining an axially inner face SI of the bead core. The axially outer two sides are also in a V formation, defining an axially outer face so of the bead core.

The expression "substantially parallel" means that the inclination angle may include a variation within +/−2 degrees and also a small difference may be provided between the taper angle of the bead seat and that of the bead bottom.

Aside from such flattened hexagonal shape, however, various shapes, e.g. a regular hexagonal shape, oval and the like may be used too.

The carcass 6 is composed of at least one ply 6A of cords arranged radially at an angle in a range of from 70 to 90 degrees with respect to the tire equator C, extending between the bead portions 4 through the tread portion 2 and sidewall portions 3, and secured to the bead cores 5 in the bead portions. For the carcass cords, steel cords are used in this example. But, organic fiber cords, e.g. aromatic polyamide, polyester, rayon, nylon and the like may be used.

Figure 2:
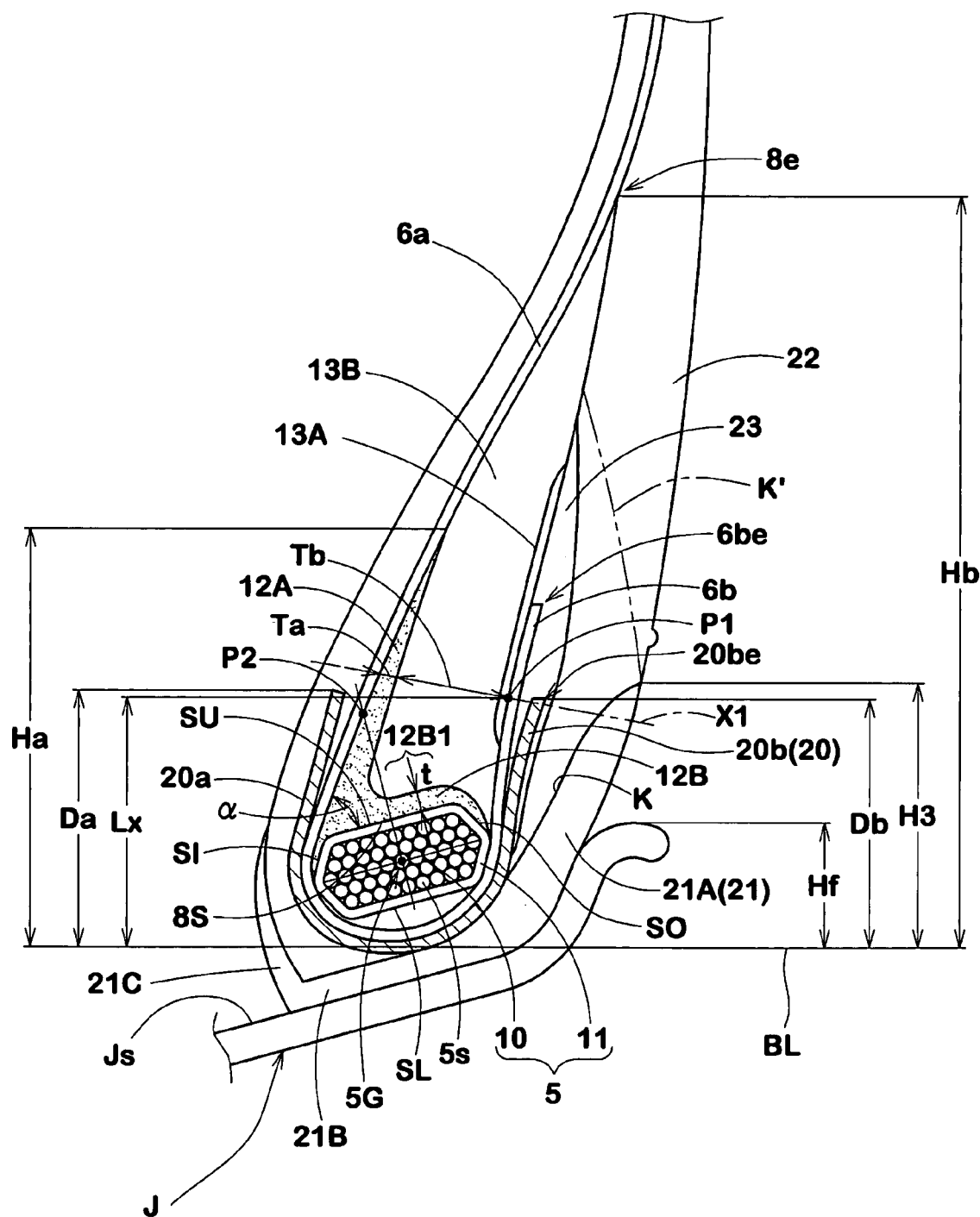
FIG. 2 is an enlarged cross sectional view showing the bead structure thereof.
Figure 3:
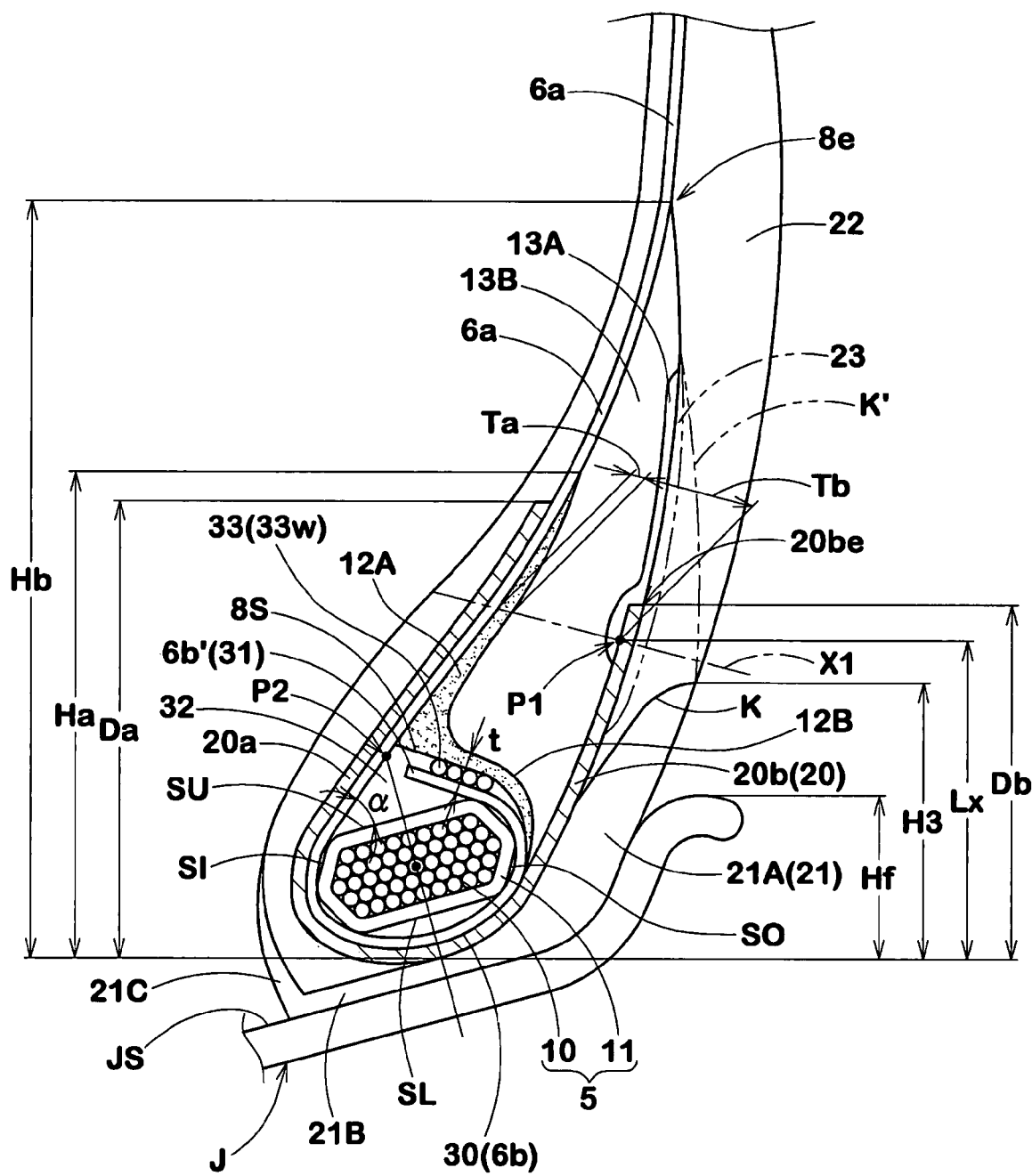
FIG. 3 is an enlarged cross sectional view showing another example of the bead structure.

FIG. 2 and FIG. 3 each show an example of the carcass structure. In each example, the carcass 6 is composed of a single ply 6A of steel cords arranged radially at an angle of 90 degrees with respect to the tire equator CO.

In the example shown in FIG. 2, to be secured to the bead cores 5, the carcass ply 6A is turned up around the bead core 5 in each of the bead portions 4 from the axially inside to the axially outside of the tire so as to form a pair of turned up portions 6b and a main portion 6a therebetween.

In the example shown in FIG. 3, to be secured to the bead cores 5, the carcass ply 6A is wound almost once around the bead core 5 in each of the bead portions 4 from the axially inside to the axially outside of the tire so as to form a pair of wound portions 6b' and a main portion 6a therebetween. The wound portion 6b' includes: a curved radially inner part 30 beneath the bead core 5; and a radially outer part 31 positioned radially outside the bead core 5 and extending axially inwardly towards the carcass main portion 6a. On the radially outside of the outer part 31, a stabilizing ring 33 is disposed to prevent springback of the carcass cords in the wound portion 6' and thereby to assure the fixation of the carcass to the bead portions. The stabilizing ring 33 is several windings of a steel cord 33w.

In order to reduce the amount of deformation of the bead portion (especially the movement towards the axially outside) occurring when heavily loaded and thereby to improve the bead durability, the inclination angle alpha of the carcass ply main portion 6a at a specific position P2 is set in a range of not more than 60 degrees, preferably not more than 55 degrees, but not less than 35 degrees, preferably not less than 40 degrees. The position P2 is the intersecting point of the carcass ply main portion 6a with a straight line drawn perpendicularly to the radially outer side SU of the bead core 5 (or the bottom surface of the bead portion) passing through the centroid 5G of the cross sectional shape of the bead core 5. The angle alpha is that of the tangent to the axially outer surface of the carcass main portion 6a at the point P2.

If the angle alpha is more than 60 degrees, the deformation increases and the sharing stress between the carcass and the adjacent rubber also increases, therefore, it is difficult to improve the bead durability. If the angle alpha is less than 35 degrees, it becomes difficult to provide a necessary lateral stiffness for the tire, and the steering stability is deteriorated.

The bead portion 4 is provided with a bead reinforcing layer 20 to increase the bead rigidity and thereby the bead durability.

The bead reinforcing layer 20 is made of steel cords arranged at an angle of from 10 to 60 degrees with respect to the tire circumferential direction. The bead reinforcing layer 20 is made up of a base part beneath the bead core 5, and two radially outwardly extending axially inner and outer parts 20a and 20b so as to have a U-shaped cross sectional shape.

The axially inner part 20a extends along the axially inner surface of the carcass main portion 6a.

The axially outer part 20b extends along the axially outer surface of the carcass ply turned up portion 6b in the case of FIG. 2, or the axially outer surface of the bead filler 8 in the case of FIG. 3.

The radial height Da of the axially inner part 20a, and the radial height Db of the axially outer part 20b are set in a range of from 150 to 300% of the wheel rim flange height Hf, each from the bead base line BL. If less than 150%, the reinforcing layer 20 can not exhibit its reinforcing effect. If more than 300%, damage becomes liable to occur starting from the outer ends of the inner part 20a and outer part 20b.

In each of the bead portions 4, a bead filler 8 is disposed. In FIG. 2, the bead filler 8 is disposed on the radially outside of the bead core 5 between the turned up portion 6b and the main portion 6a of the carcass. In FIG. 3, the bead filler 8 is disposed on the radially outside of the radially outer part 31 of the wound portion 6b'.

The bead filler 8 is composed of a main layer 13 made of a low modulus rubber and a fastening layer 12 made of a high modulus rubber.

The complex elastic modulus E*1 of the fastening layer 12 is set in a range of not less than 20 Mpa, preferably not less than 35 Mpa, but not more than 70 Mpa, preferably not more than 60 Mpa. The complex elastic modulus E*2 of the main layer 13 is set in a range of not less than 2.0 Mpa, but not more than 6.0 Mpa.

As shown in FIGS. 2 and 3, the bead filler 8 has a radially-elongated generally triangular cross sectional shape having a bottom 8S, an axially outer side and an axially inner side.

The fastening layer 12 extends along the bottom 8s from the axially outer end to the inner end of the bottom 8s, defining its base portion 12B. Then, turning radially outwards, the fastening layer 12 extends along the axially inner side to the middle thereof, defining its axially inner portion 12A.
Thus, the fastening layer 12 has a L-shaped cross sectional shape. The opening angle (alpha) between the two portions 12A and 12B is an acute angle in a range of 60 to 35 degrees.

The axially inner portion 12A extends radially outwardly up to a radial height Ha, abutting on the axially outer surface of the carcass main portion 6a.

The main layer 13 further extends radially outwardly up to a radial height Hb, abutting on the axially outer surface of the carcass main portion 6a from the position of the radially outer end of the axially inner portion 12A.

The above-mentioned height Hb of the radially outer end of the main layer 13 is set in a range of from 40 to 100 mm from the bead base line BL.

The height Ha of the radially outer end of the fastening layer 12 is set in a range of from 35 to 100 mm from the bead base line BL.

As shown in FIG. 2 and FIG. 3, the axially inner portion 12A is continuously decreased in the thickness towards the radially outer end thereof.

when measured along a straight line X1 drawn perpendicularly to the axially outer surface of the bead filler 8 from a point P1 thereon at a distance Lx of 25 mm radially outwards from the bead base line BL:

the thickness Ta of the axially inner portion 12A is not less than 1.0 mm, preferably not less than 1.5 mm, but not more than 4.0 mm, preferably not more than 3.0 mm;

the thickness Tb from the point P1 to the axially inner portion 12A is not less than 7.0 mm, preferably not less than 10.0 mm, but not more than 13.0 mm, preferably not more than 12.0 mm; and the ratio Ta/Tb is set in a range of not less than 0.1, preferably not less than 0.15, but not more than 0.35, preferably not more than 0.25.

In the above-mentioned base portion 12B, the axially outer end part thereof is tapered towards the axially outside, and the axially inner end part becomes thicker as the axially inner portion 12A is connected thereto. The middle part 12B1 therebetween has an almost constant thickness (t) in a range of 0.5 to 3.0 mm In the carcass turnup structure shown in FIG. 2, as the bead filler 8 is disposed on the radially outside of the bead core 5, the base portion 12B directly contact with the bead core 5, and the base portion 12B is extended onto the axially inner face SI and axially outer face SO of the bead core 5.

In the carcass wound structure shown in FIG. 3, as the bead filler 8 is disposed on the radially outside of the stabilizing ring 33 and the radially outside of the part 31 of the wound portion 6b', without contacting with the bead core 5, the base portion 12B extends axially inwardly to a point on the axially outer surface of the carcass main portion 6a positioned above the center 5G of the bead core 5, and axially outwardly to a separating point at which the axially outer part 20b of the bead reinforcing layer 20 separates from the carcass.
From this separating point, the bead reinforcing layer 20 extends radially outwardly along the axially outer surface of the bead filler 8 and terminates at a middle point thereof.

In order to mitigate the stress at the cut end of the part 31, a bead core 32 made of a rubber having a complex elastic modulus E*3 smaller than that of the fastening layer 12 is disposed in a space on the radially outside of the bead core 5 which space is surrounded by the carcass main portion 6a, bead core 5 and the bead filler 8. Preferably, the complex elastic modulus E*3 is set in a range of from 5.0 to 10.0 Mpa.

The bead portions 4 are each provided with a wear-resistant bead rubber 21 having a hardness Hs4 of from 60 to 79. The bead rubber 21 comprises: a base part 21B extending between the bead toe and bead heel, defining the bottom face of the bead portion 4; an axially outer part 21A extending radially outwardly from the bead heel beyond the upper end of the wheel rim flange, defining the axially outer surface of the bead portion; and an axially inner part 21c extending radially outwardly from the bead toe.

The axially inner part 21c has a radially outer end tapered, and terminates at a radially height substantially same as that of the bead core.

The axially outer part 21A has a radially outer end tapered and overlap spliced with the radially inner end of the sidewall rubber 22.

The sidewall rubber 22 is softer than the bead rubber 21 and disposed on the axially outside of the carcass 6 in each of the sidewall portions 3, defining the outer surface of the tire.

On the tire outer surface, the boundary between the bead rubber 21 and sidewall rubber 22 lies at a height H3, which is more than the height Hf of the wheel rim flange but less than the height Ha of the fastening layer 12.

In the examples shown in FIGS. 2 and 3, the interface K between the bead rubber 21 and sidewall rubber 22 extends from the axially outer part 20b of the bead reinforcing layer 20 to the outer surface of the bead portion 4, while inclining radially outside towards the axially outside of the tire. However, it is also possible that the interface K is inclined radially inside towards the axially outside of the tire as indicated by imaginary like K'.

It is preferred that the cut ends of the reinforcing cord layers such as the radially outer end 6be of the carcass ply and the radially outer end 20be of the bead reinforcing layer 20, are covered with a rubber layer softer than the adjacent rubber in order to prevent a separation failure starting from the cut ends. For that purpose, the bead filler 8 in this embodiment further includes a rubber layer 13A disposed along the axially outer surface of the main layer 13. This layer 13A is a part of the main layer 13, and made of a rubber having a complex elastic modulus E*2' in the same range of from 2.0 to 6.0 Mpa but lower than that of the main part 13B of the main layer 13. The thickness of the layer 13A is at least 0.5 mm but at most 2.0 mm, excepting its radially inner and outer tapered end portions.

In the example shown in FIG. 2 wherein the end 6be is positioned radially outside the end 20be, the rubber layer 13A extends radially outwardly along the axially inner surface of the turned up portion 6b beyond the outer end 6be thereof and prevents the end 6be from directly contacting with the main layer main part 13B.
In this example, further, a cushion rubber layer 23 is disposed on the axially outside of the carcass turned up portion 6b and the axially outer part 20b of the bead reinforcing layer 20. This cushion rubber layer 23 is made of a rubber having a complex elastic modulus in a range of 2.0 to 6.0 Mpa and lower than that of the bead rubber 21 and also lower than that of the main layer's main part 13B. Thus, the end 6be is sandwiched between the rubber layers 23 and 13A. As the end 20be is lower than the end 6be, in order to cover the ends 20be, the layer 23 is penetrated into a space formed between the turned up portion 6b and the axially outer part 20b.

In the case of FIG. 3, the rubber layer 13A extends radially outwardly along the axially inner surface of the axially outer part 20b beyond the outer end 20be thereof and prevents the end 20be from contacting directly with the main layer main portion 13B. In this example, the cushion rubber layer 23 is not provided. The softer sidewall rubber 22 is utilized instead. Thus, the end 20be is sandwiched between the rubber layer 13A and the sidewall rubber 22. But, it is also possible in this example too, that the rubber layer 23 is disposed as indicated by imaginary line.

As described above, since the fastening layer 12 has the L-shaped cross sectional shape, a radially inner and axially inner part of the main layer 13 is inserted between the axially inner portion 12A and the base portion 12B. Therefore, when the bead portion is forced axially outwards, as the main layer 13 is wedged between the portions 12A and 12B of the fastening layer 12, and resists against the compressive stress, the bead filler 8 as a whole can bring out a high bending rigidity. Therefore, if the volume of the fastening layer 12 is the same as the conventional triangular stiffener, an increased bending rigidity can be obtained. If the same rigidity is sought, the volume can be decreased. If the total bead filler volume is the same, as the percentage of the main layer volume is increased, the effect to mitigate the shear stress occurring on the axially outside of the bead filler can be increased. On the other hand, as the internal energy loss of the high modulus rubber is relatively high, the reducing of the volume of such rubber facilitates a decrease in the rolling resistance of the tire.

If the height Hb less than 40 mm and/or the height Ha less than 35 mm, as the lateral stiffness (rigidity) of the tire is decreased, it becomes difficult to secure the steering stability. If the height Hb is more than 100 mm and/or the height Ha is more than 100 mm, the volume of the bead filler 8 and/or the fastening layer 12 increases, defeating the original purpose.

If the thickness Ta is less than 1.0 mm and/or the ratio Ta/Tb is less than 0.1, the lateral stiffness of the tire becomes insufficient. If the thickness Ta is more than 4.0 mm and/or the ratio Ta/Tb is more than 0.35, the effect to mitigate the shear stress becomes insufficient, and there is a possibility that the bead durability is decreased.

If the thickness Tb is less than 7.0 mm, the effect to mitigate the shear stress becomes insufficient, and there is a tendency that the lateral stiffness of the tire is decreased. If the thickness Tb is more than 13.0 mm, the volume of the bead filler 8 increases, defeating the original purpose.

If the complex elastic modulus E*1 of the fastening layer 12 is less than 20 Mpa, the lateral stiffness of the tire becomes insufficient, and it is difficult to secure the steering stability. If more than 70 Mpa, the effect to mitigate the shear stress becomes insufficient, and it is difficult to improve the bead durability.

If the complex elastic modulus E*1 of the main layer 13 is less than 2.0 Mpa, the lateral stiffness of the tire becomes insufficient, and it is difficult to secure the steering stability. If more than 6.0 Mpa, the effect to mitigate the shear stress becomes decreased, and it is difficult to improve the bead durability.

Comparison Tests

Heavy duty radial tires of size 11R22.5 (rim size 7.50×22.5) were made and tested for the bead durability and steering stability. The test tires has the same structure except for the specifications show in Table 1.

Bead Durability Test:

Using a tire test drum, the test tire was run under the following accelerated condition until any failure was observed in the bead portions, and the elapsed time was measured.

Tire inflation pressure: Maximum pressure of 800 kPa

Tire load: 300% of Maximum load (=26.7 kN×3)

Running speed: 20 km/h

The results are shown in Table 1 by an index based on Ref. 1 being 100, wherein the larger the value, the better the durability.

Steering Stability Test:

In order to obtain the lateral spring constant of the tire, the tire inflated to the maximum pressure of 800 kPa and loaded with the maximum tire load of 26.7 kN (vertical load) was applied with a lateral load of 2.0 kN, and the resultant lateral deflection was measured and the lateral spring constant was computed. The results are shown in Table 1 by an index based on Ref. 1 being 100, wherein the larger the lateral spring constant, the better the steering stability.

TABLE 1

Figure 4:
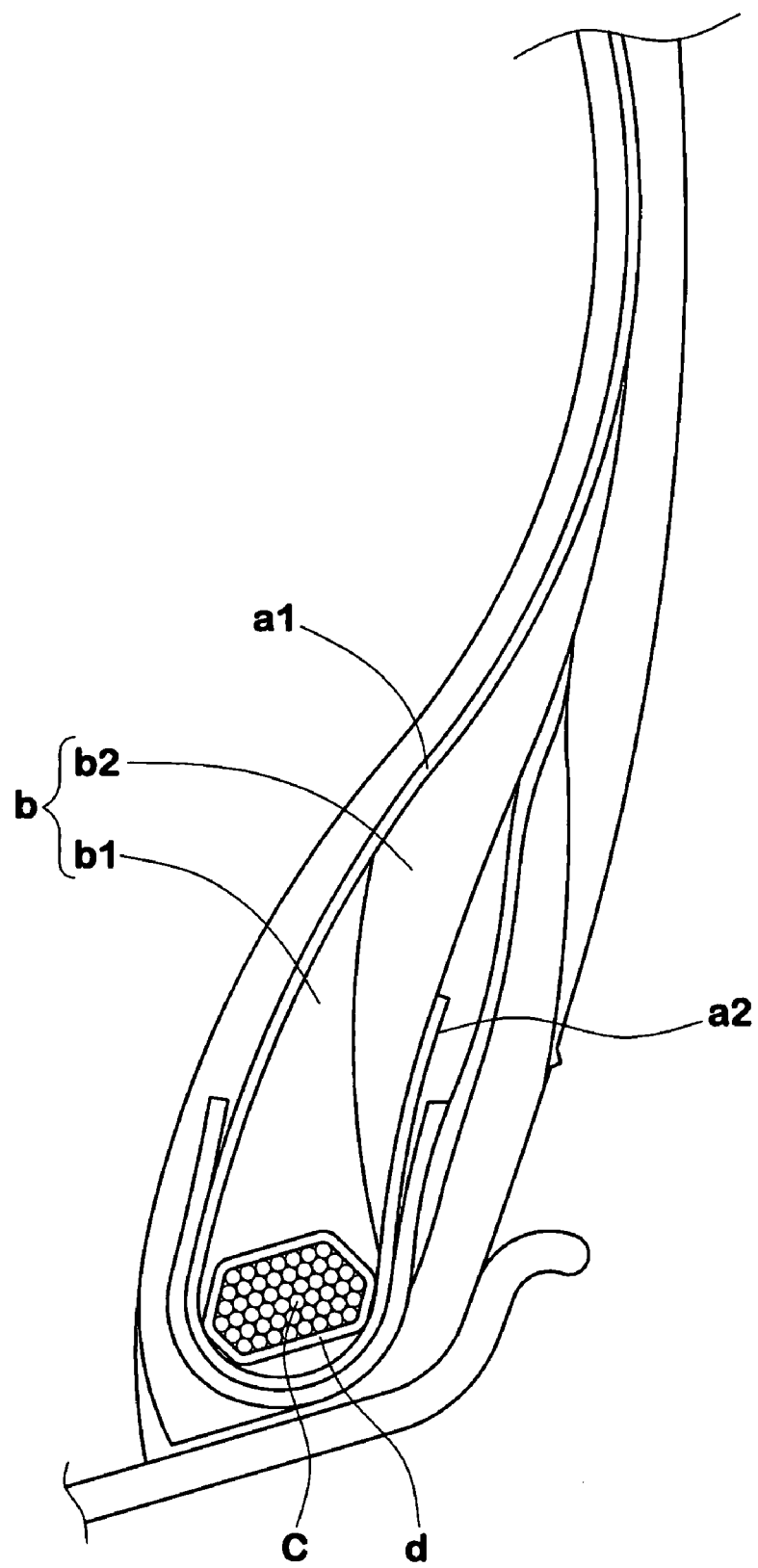
FIG. 4 is an enlarged cross sectional view showing the prior art bead structure.

| Tire | Ex. 1 | Ex. 2 | Ex. 3 | Ex. 4 | Ref. 3 | Ex. 5 | Ex. 6 | Ex. 7 | Ref. 1 | Ref. 2 | Ref. 4 |
|---|---|---|---|---|---|---|---|---|---|---|---|
| Bead structure | FIG. 2 | FIG. 3 | FIG. 2 | FIG. 2 | FIG. 2 | FIG. 2 | FIG. 2 | FIG. 3 | FIG. 4 | FIG. 2 | FIG. 2 |
| Angle alpha (deg.) | 44 | 44 | 39 | 49 | 55 | 44 | 44 | 44 | 65 | 37 | 39 |
| Main layer | | | | | | | | | | | |
| Height Hb (mm) | 70 | 70 | 70 | 70 | 110 | 70 | 70 | 70 | 70 | 70 | 70 |
| Modulus E*2 (Mpa) | 4.0 | 4.0 | 4.0 | 4.0 | 4.0 | 4.0 | 4.0 | 4.0 | 4.0 | 4.0 | 4.0 |
| Fastening layer | L shape | L shape | L shape | L shape | L shape | L shape | L shape | L shape | triangle | L shape | L shape |
| Height Ha (mm) | 45 | 45 | 45 | 45 | 45 | 45 | 45 | 45 | 45 | 45 | 45 |
| Modulus E*1 (Mpa) | 50.0 | 50.0 | 50.0 | 50.0 | 50.0 | 50.0 | 50.0 | 50.0 | 50.0 | 50.0 | 50.0 |
| Thickness Ta (mm) | 2.0 | 2.0 | 1.0 | 3.5 | 2.0 | 2.0 | 2.0 | 2.0 | 5.0 | 0.5 | 2.0 |
| Thickness Tb (mm) | 11.0 | 11.0 | 10.0 | 10.0 | 11.0 | 8.0 | 7.0 | 7.0 | 10.0 | 10.0 | 6.0 |
| Ratio Ta/Tb | 0.18 | 0.18 | 0.10 | 0.35 | 0.18 | 0.25 | 0.28 | 0.28 | 0.50 | 0.05 | 0.33 |
| Bead durability | 120 | 150 | 100 | 100 | 100 | 110 | 100 | 120 | 100 | 105 | 90 |
| Steering stability | 100 | 100 | 100 | 110 | 100 | 100 | 100 | 100 | 100 | 90 | 90 |

| Tire | Ex. 1 | Ex. 8 | Ex. 9 | Ex. 10 | Ref. 5 | Ref. 6 |
|---|---|---|---|---|---|---|
| Bead structure | FIG. 2 | FIG. 2 | FIG. 2 | FIG. 2 | FIG. 2 | FIG. 2 |
| Angle alpha (deg.) | 44 | 44 | 44 | 44 | 44 | 44 |
| Main layer | | | | | | |
| Height Hb (mm) | 70 | 70 | 70 | 70 | 70 | 70 |

TABLE 1-continued

| | | | | | | |
|---|---|---|---|---|---|---|
| Modulus E*2 (Mpa) | 4.0 | 4.0 | 4.0 | 4.0 | 4.0 | 4.0 |
| Fastening layer | L shape | L shape | L shape | L shape | L shape | L shape |
| Height Ha (mm) | 45 | 45 | 45 | 45 | 45 | 45 |
| Modulus E*1 (Mpa) | 50.0 | 70 | 30 | 20 | 10 | 80 |
| Thickness Ta (mm) | 2.0 | 2.0 | 2.0 | 2.0 | 2.0 | 2.0 |
| Thickness Tb (mm) | 11.0 | 11.0 | 11.0 | 11.0 | 11.0 | 11.0 |
| Ratio Ta/Tb | 0.18 | 0.18 | 0.18 | 0.18 | 0.18 | 0.18 |
| Bead durability | 120 | 120 | 110 | 100 | 100 | 100 |
| Steering stability | 100 | 110 | 100 | 100 | 90 | 110 |

The invention claimed is:

1. A heavy duty tire comprising
a tread portion,
a pair of sidewall portions,
a pair of bead portions each with a bead core therein,
a carcass ply having a main portion extending from the axially inside of the bead core in one of the bead portions to the axially inside of the bead core in the other bead portion, and
a bead filler disposed on the axially outside of the carcass ply main portion in each of the bead portions,
the bead filler having: an axially inner surface abutting on the main portion of the carcass ply; an axially outer surface; and a radially inner surface, to have a radially outwardly tapered cross sectional shape, wherein
the bead filler comprises: a main layer made of a rubber having a complex elastic modulus E*2 of from 2.0 to 6.0 Mpa; and a fastening layer made of a rubber having a complex elastic modulus E*1 of from 20 to 70 Mpa,
the fastening layer comprises a base portion and an axially inner portion to have a L-shaped cross sectional shape,
the base portion extends along the radially inner surface of the bead filler, and comprises
an axial middle part having a substantially constant thickness of form 0.5 to 3.0 mm,
an axial outer end part tapered towards the axially outside, and
an axial inner end part having a thickness gradually increasing towards the axially inside and connected to said axially inner portion,
the axially inner portion extends radially outwardly from the axially inner end of the base portion along the axially inner surface of the bead filler,
the height Ha of the axially inner portion is in a range of from 35 to 100 mm from the bead base line, and not more than the height Hb of the main layer, and the radial height Hb is in a range of from 40 to 100 mm from the bead base line, and
the thickness of the axially inner portion gradually decreases towards the radially outside of the tire so that, in a cross section of the tire including the rotational axis of the tire, when measured along a straight line X1 drawn perpendicularly to the axially outer surface of the bead filler from a point P1 on the axially outer surface at a distance of 25 mm radially outward from the bead base line:
the thickness Tb from the axially outer surface of the bead filler to the interface between the axially inner portion and the main layer is 7.0 to 3.0 mm;
the thickness Ta from the interface to the axially inner surface of the axially inner portion is 1.0 to 4.0 mm;
the ratio Ta/Tb is 0.1 to 0.35; and
a radially and axially inner part of the main layer is disposed between the axially inner portion and the base portion of the fastening layer and extends axially inwardly beyond a straight line drawn perpendicularly to the bottom surface of the bead portion passing through a centroid of the cross sectional shape of the bead core.

2. The tire according to claim 1, wherein
when measured at a position (P2) over the bead core, the main portion of the carcass ply is inclined at an angle (alpha) in a range of from 35 to 60 degrees with respect to the bottom surface of the bead portion.

3. The tire according to claim 2, wherein
the carcass ply is turned up around the bead core in each said bead portion from the axially inside to the outside of the tire to form a turned up portion, and the turned up portion extends along the axially outer surface of the bead filler, and terminates in the axially outer surface.

4. The tire according to claim 1, wherein
the carcass ply is turned up around the bead core in each said bead portion from the axially inside to the outside of the tire to form a turned up portion, and the turned up portion extends along the axially outer surface of the bead filler, and terminates in the axially outer surface.

5. A heavy duty tire comprising
a tread portion,
a pair of sidewall portions,
a pair of bead portions each with a bead core therein,
a carcass ply having a main portion extending from the axially inside of the bead core in one of the bead portions to the axially inside of the bead core in the other bead portion, and
a bead filler disposed on the axially outside of the carcass ply main portion in each of the bead portions,
the bead filler having: an axially inner surface abutting on the main portion of the carcass ply; an axially outer surface; and a radially inner surface, to have a radially outwardly tapered cross sectional shape, wherein
the bead filler comprises: a main layer made of a rubber having a complex elastic modulus E*2 of from 2.0 to 6.0 Mpa; and a fastening layer made of a rubber having a complex elastic modulus E*1 of from 20 to 70 Mpa,
the fastening layer comprises a base portion and an axially inner portion to have a L-shaped cross sectional shape,
the base portion extends along the radially inner surface of the bead filler,
the axially inner portion extends radially outwardly from the axially inner end of the base portion along the axially inner surface of the bead filler,
the height Ha of the axially inner portion is in a range of from 35 to 100 mm from the bead base line, and not more than the height Hb of the main layer, and the radial height Hb is in a range of from 40 to 100 mm from the bead base line, and
the thickness of the axially inner portion gradually decreases towards the radially outside of the tire so that, in a cross section of the tire including the rotational axis of the tire, when measured along a straight line X1 drawn perpendicularly to the axially outer surface of the bead filler from a point P1 on the axially outer surface at a distance of 25 mm radially outward from the bead base line:

the thickness Tb from the axially outer surface of the bead filler to the interface between the axially inner portion and the main layer is 7.0 to 13.0 mm;

the thickness Ta from the interface to the axially inner surface of the axially inner portion is 1.0 to 4.0 mm; and the ratio Ta/Tb is 0.1 to 0.35, wherein the carcass ply is wound around the bead core in each said bead portion from the axially inside to the outside of the tire to form a wound portion, and the wound portion has a radially outer part which extends axially inwardly towards the carcass ply main portion, while passing through between the bead core and the radially inner surface of the bead filler.

* * * * *